Jan. 16, 1934.  M. H. CARPENTER ET AL  1,943,721
INDEPENDENTLY SPRUNG WHEEL MOUNTING FOR MOTOR VEHICLES
Filed April 4, 1929  2 Sheets-Sheet 2
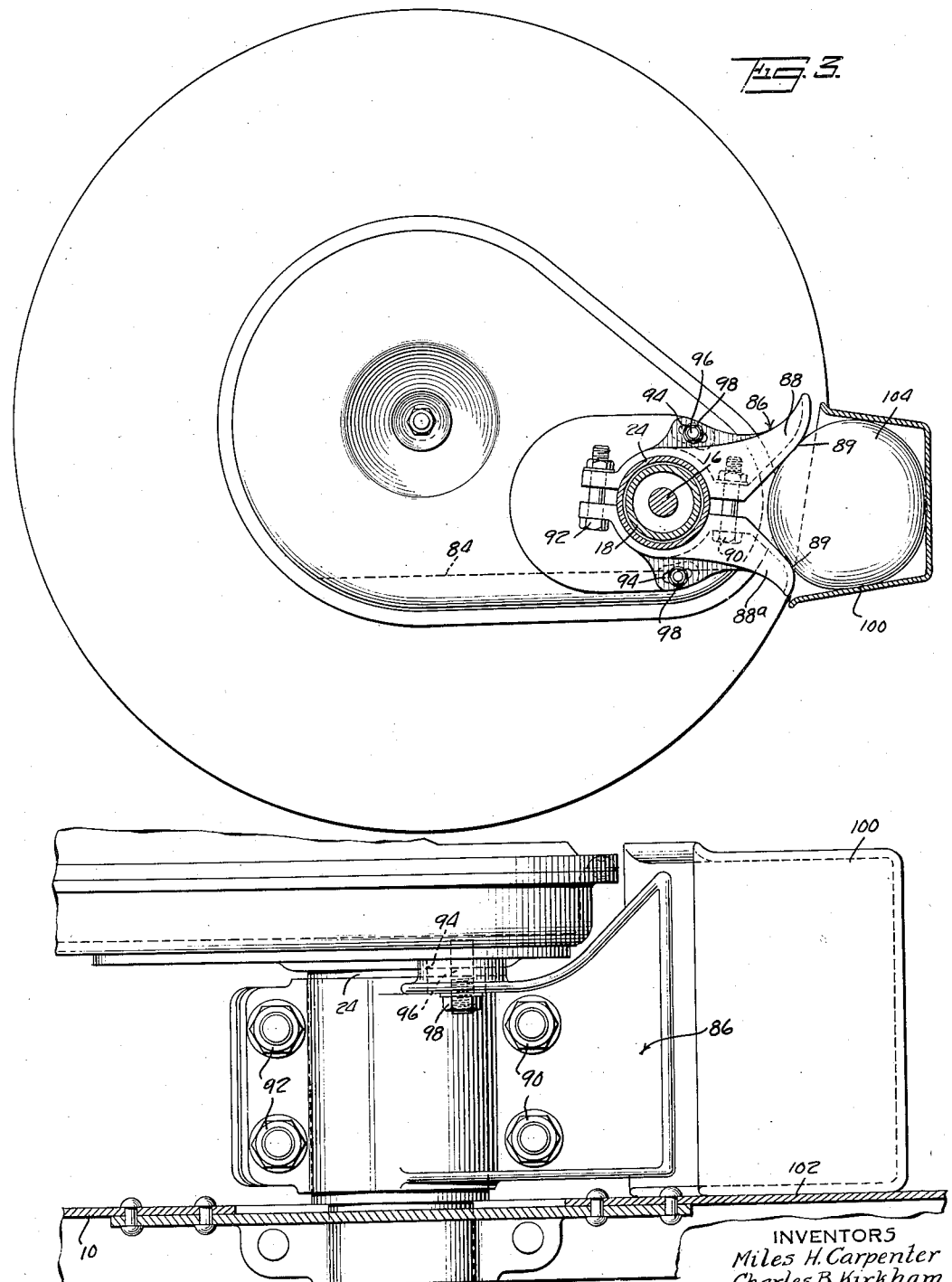
INVENTORS
Miles H. Carpenter
Charles B. Kirkham
BY
Dyke, Holden and Schaines
ATTORNEYS Patented Jan. 16, 1934

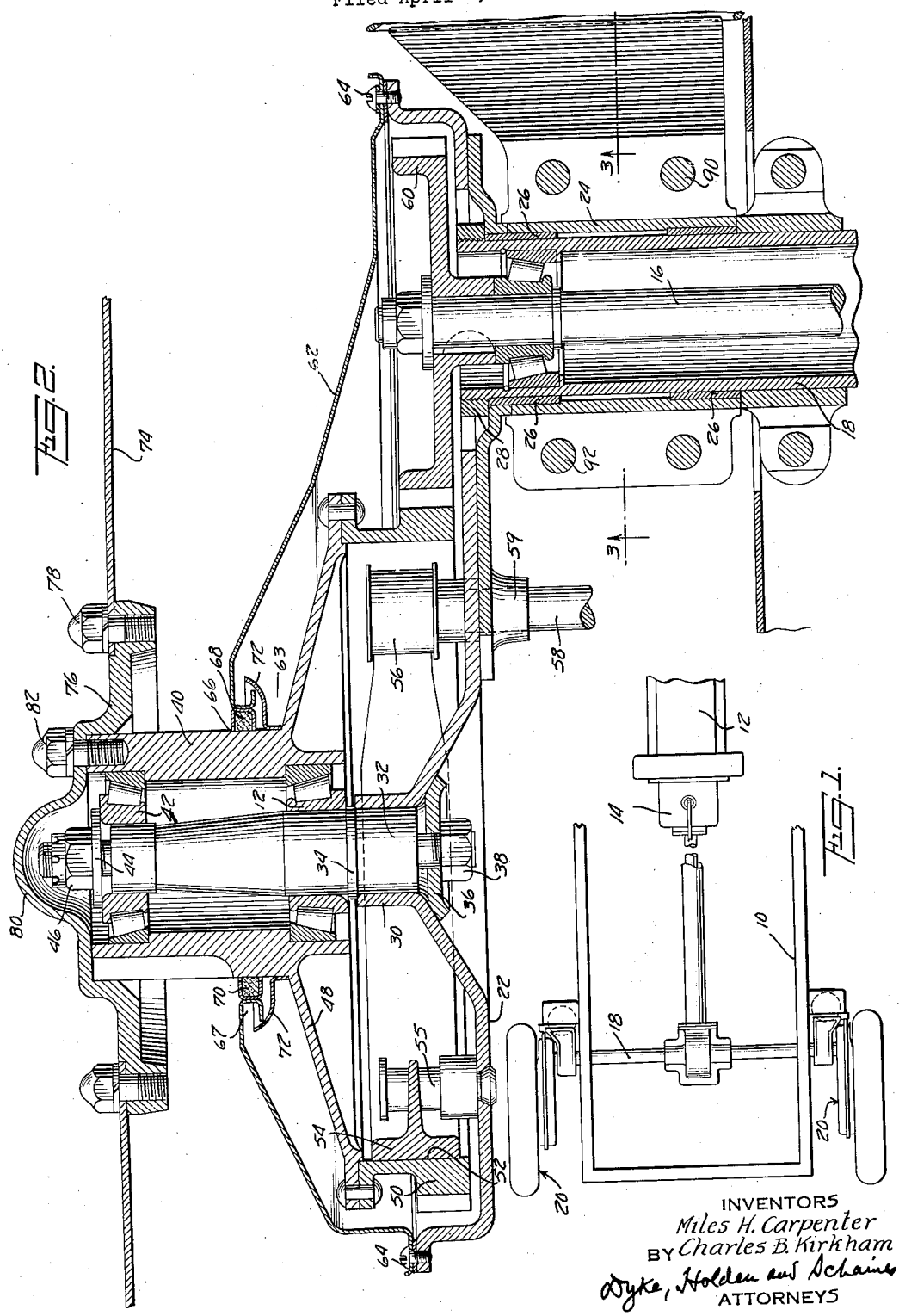

1,943,721

UNITED STATES PATENT OFFICE 1,943,721

INDEPENDENTLY SPRUNG WHEEL MOUNTING FOR MOTOR VEHICLES

Miles H. Carpenter, New Rochelle, and Charles B. Kirkham, Freeport, N. Y.

Application April 4, 1929. Serial No. 352,417

8 Claims. (Cl. 180—71)

Our invention relates to wheel suspensions for motor vehicles, such as automobiles, airplanes and the like and the same has for its object more particularly to provide a simple, reliable and efficient wheel mounting which permits of the wheels being independently sprung so that shocks imparted to one are not transmitted to the other.

Another object of the invention is to provide an independently sprung wheel mounting which permits of the body, frame or chassis of the vehicle being located relatively low.

Another object of the invention is to provide a mounting or suspension of the character specified in which the relatively moving parts, such as the braking or driving mechanism, or both are enclosed in a substantially fluid tight heat radiating receptacle for receiving lubricating oil subject to agitation or splashing by the moving parts within said receptacle.

Another object of the invention is to provide a mounting or suspension for the rear wheels of a motor vehicle in which the wheel supporting members thereof are resiliently mounted for movement about an axis substantially coincident with the axis of the jack shaft.

Another object of the invention is to provide a mounting or suspension of the character specified which is mounted for vertical movement relative to the body, frame or chassis of the vehicle and which constitutes a receptacle for receiving the driving and braking mechanism and for containing oil for lubricating or cooling the same.

Another object of the invention is to provide a wheel mounting or suspension of the character specified in which the wheel is secured to the hub cap instead of to the brake drum to permit of the latter being completely enclosed in the lubricating receptacle or enclosure therefor.

In the accompanying drawings we have illustrated an embodiment of the invention for the purpose of affording an understanding thereof.

In said drawings:

Figure 1 is a plan view of the rear end of a motor vehicle, illustrating one form of wheel mounting constructed according to and embodying our said invention;

Fig. 2 is an enlarged horizontal sectional view thereof;

Fig. 3 is a sectional view on the line 3—3 of Fig. 2; and

Fig. 4 is a plan thereof.

Referring to the drawings there is shown at Fig. 1 the automobile body or frame 10 having mounted thereon an engine or motor 12, speed-change box 14, and differential driving mechanism including the differential jack shafts 16 and tubes 18 enclosing the same, the two latter projecting beyond the opposite sides of the body or frame 10 and having associated therewith the independently sprung rear wheel mountings 20. Each mounting 20 comprises a sheet metal portion 22 having a sleeve portion 24 at the rear thereof disposed upon the tube 18 for oscillatory or pivotal movement about the same, tubular bushings 26 of metal or other material being disposed between the tube 18 and sleeve 24 for reducing friction. A nut 28 threaded upon the tube 18 retains the mounting 20 in place upon the jack tube 18. For purposes of construction the sheet metal portion 22 and sleeve portion 24 are separate pieces welded together.

The mounting portion 22 centrally thereof is provided with an outwardy extending tubular bearing 30 receiving the spindle 32. The spindle 32 intermediate its length has a flange 34 adapted to engage the outer end of the bearing 30 and is clamped in position by means of a washer 36 at the inner end thereof secured by nut 38. A hub portion 40 is received upon the spindle 32 for rotation relative thereto, suitable antifriction bearings 42 being interposed between the spindle and said hub portion 40. The outer of the antifriction bearings 42 is retained in position by means of a washer 44 and nut 46 upon the outer end of the spindle 32. The inner end of the hub portion 40 has an inwardly flaring flange 48 to which is secured an annular gear 50 also constituting at the inner surface 52 thereof a brake drum adapted to be engaged by the brake shoes 54 pivoted at 55 to the portion 22 and operated by the cam 56 at the free ends thereof and a shaft 58 passing through the sleeve 59 on the part 22 and controlled by the driver. The gear 50 meshes with a gear 60 keyed upon the end of the jack shaft 16.

The sheet metal portion 22 and a cover portion or plate 62 form a casing or receptacle 63 for receiving the driving and brake mechanism indicated at 50, 54 and 60. The cover plate 62 enclosing the outer side of the gear drive is detachably secured by the screws 64 to the portion 22 at the flanged periphery thereof to provide a fluid tight joint. The central portion of the cover plate 62 is provided with opening 66 through which the hub portion 40 passes, the edge portions about the opening being bent to form a channel 67 open at the side remote from the hub portion 40. An annular channel portion 68 is welded to the transverse portion of the channel shaped edge 67 of the cover plate 62. Disposed within the annular channel 68 is suitable packing 70 of fibrous material or the like in contact with the hub 40 and serving to form a substantially fluid tight joint between the hub 40 and the cover plate 62. A suitable apron or baffle 72 is secured about the hub 40 within the receptacle 63 and extends about the portions 67 and 68 to prevent lubricating oil from being splashed on the joint formed by the packing 70 and to cause agitation of the lubricating oil within the receptacle. The wheel 74 which is preferably of the disk type, is detachably secured to the wheel driving flange 76 by means of the screws 78. In the present construction the brake drum is disposed within the casing 63 and said member 76 is therefore formed as part of the hub cap 80, the combined wheel driving flange and hub cap being detachably secured to the hub portion 40 by means of the screws 82.

The chamber 63 can contain oil up to, say, a normal level as indicated at 84, and serves to lubricate the enclosed parts including the gears 50 and 60, the preferably metallic brake shoes 54 and the antifriction devices 42, bushings 26 and the bearings for shaft 16.

While the movement of the independently mounted wheels can be resisted by steel springs suitably connected to the parts, however, I preferably make use of rubber or like yieldable material under compression for resisting such movement.

The resilient means for this purpose is indicated generally at 86 and comprises a pair of flared members 88, 88a having convex opposing surfaces 89. The members 88, 88a are clamped by means of the bolts 90 and 92 to the sleeve portion 24, and are also provided with arcuate slots 94 receiving the studs 96 riveted or otherwise secured to the portion 22, said studs 96 being provided with nuts 98 whereby the members 88 may be additionally secured in position. By loosening the bolts 90 and 92 and nuts 98 the position of the members 88, 88a relative to each other and relative to the tubular sleeve 24 may be suitably adjusted. A receptacle 100 open at the end facing said members 88, 88a is secured, as by welding, to the frame or body 10 of the automobile as indicated at 102. A rubber member 104 preferably of spherical formation, is disposed within the receptacle 100 between the flaring convex surfaces 89 of the members 88, 88a. The rubber ball 104 has a wall of substantial thickness, but the same may be either pneumatic or solid. The space provided in the container 100 is sufficiently larger than the rubber member 104 to permit of the distortion or displacement of the latter when under compression.

In operation, when the motor 12 is running, movement is communicated to the wheels 74 through the jack shaft 16 and gears 60 and 50. In case it is desired to retard the movement of the vehicle, the braking mechanism is operated through the shaft 58.

The casing or receptacle 63 receives the moving parts and the lubricating oil therefor which is agitated or splashed about by movement of the gears 50 and 60 whereby to thoroughly lubricate and cool the gearing and braking mechanism, and such lubricating oil is also available for lubricating the antifriction bearings.

When it is desired to remove the wheel 74 all that is necessary is to first remove the screws 78. In case access is desired to the spindle 32, the wheel 74 is removed together with the cap 80 by removing the screws 82 without removing the screws 78. By removing the nut 46, washer 44 and the screws 64 the entire hub portion 40 together with the gear 50 may be readily removed for repairs or other purposes.

The upper member 88 provides a surface for contact with the loading side of the ball 104 and the lower member 88a provides a surface for contact with the ball 104 upon rebound. When the upper member 88 is depressed it compresses the ball in the receptacle or ball container 100.

The angular relation of the members 88, 88a, may be adjusted to impose an initial compression upon ball 104 such that for a given load the device will respond efficiently both upon imposition of abnormal load thereon and upon the rebound resulting therefrom.

The members 88, 88a, can also be adjusted about the sleeve 24 to compensate for the load to be carried, whereby to maintain for a given load the desired elevation of the body of the car above the ground.

Apparatus in accordance with our invention comprises numerous features of advantage. The wheels being independently sprung, shocks imparted to one are not transmitted to the other, the brake working parts as well as the gearing are wholly enclosed, the same and related parts are oiled by splash oiling within the enclosures, the parts are not likely to be clogged or hindered in their action by mud or ice, the resilient medium is inexpensive and yet efficient, the unsprung weight reduced to the minimum, and various other features of advantage secured.

We claim:

1. The combination with a body member of a motor vehicle, of a supporting member mounted for vertical movement relative to said body member, and constituting a receptacle for receiving lubricating oil, a hub portion extending into said receptacle and mounted for rotation relative thereto, an annular gear secured to said hub portion within said receptacle, the inner side of said annular gear constituting a brake drum, means within said receptacle cooperating with said drum for controlling the movement thereof, and driving means within said receptacle meshing said annular gear.

2. A wheel mounting for motor vehicles comprising a supporting member constituting a receptacle for receiving lubricating oil, a spindle thereon, a hub portion on said spindle extending into said receptacle, a brake drum on said hub portion within said receptacle, means therein cooperating with said drum for controlling the movement thereof, and a combined hub cap and wheel carrying flange secured to said hub portion and closing the end thereof.

3. The combination with a body member of a motor vehicle, of a supporting member mounted for vertical movement relative to said body member, a hub portion rotatably mounted on said supporting member, a brake drum on said hub portion, a brake shoe on said supporting member cooperating with said drum, a cover plate disposed about said hub portion and detachably secured at the periphery thereof to the periphery of said supporting member, said cover plate and said supporting member constituting a receptacle enclosing said brake drum and said brake shoe and adapted to receive lubricating oil, and means interposed between said hub portion and said cover plate for preventing passage of oil thereby.

4. A wheel mounting for motor vehicles comprising a supporting plate having a pivotal connection, an axle thereon in offset relation to the pivotal connection, a hub on said axle, transmission and brake means associated with said hub, a cover plate having an opening for the hub, and means for securing said cover plate at the margin thereof to said supporting plate to form therewith an enclosure for the transmission and brake means, said cover plate being movable axially on the hub to remove the same.

5. A wheel mounting for motor vehicles comprising a flanged supporting plate having a sleeve for pivotal movement on a jack shaft tube, an axle on the supporting plate in offset relation to said sleeve, a hub on said axle having a flange at the inner end thereof, an annular gear on said flange, the inner side of said gear forming a brake drum, a gear meshing with said first gear and driven from the jack shaft, and a cover plate having an opening for the hub and secured at the margin to the flange of said supporting plate.

6. A wheel mounting comprising a supporting plate mounted for vertical movement, an axle thereon, a hub on said axle having an extension at the inner end thereof, transmission and brake means carried by said extension, and a plate having an opening receiving the hub and movable axially thereof for removal, said plate being secured at the margin thereof to said supporting plate to form an enclosure extending over said extension and transmission and brake means.

7. A wheel mounting comprising a supporting plate mounted for vertical movement, an axle thereon, a hub on said axle having an extension at the inner end thereof, transmission and brake means carried by said extension, and a plate having an opening receiving the hub and movable axially thereof for removal, said plate being secured at the margin thereof to said supporting plate to form an enclosure extending over said extension and transmission and brake means, and means interposed between said hub and said cover plate for preventing passage of oil thereby.

8. A wheel mounting comprising a supporting plate mounted for vertical movement, an axle thereon, a hub on said axle having an extension at the inner end thereof, transmission and brake means carried by said extension, and a plate having an opening receiving the hub and movable axially thereof for removal, said plate being secured at the margin thereof to said supporting plate to form an enclosure extending over said extension and transmission and brake means, a hub cap detachably secured to said hub and having an integral flange, and a wheel detachably secured to said flange.

MILES H. CARPENTER.
CHARLES B. KIRKHAM.